(12) United States Patent
Chinomi

(10) Patent No.: US 10,902,649 B2
(45) Date of Patent: Jan. 26, 2021

(54) IMAGE RECONSTRUCTION PROCESSING METHOD, IMAGE RECONSTRUCTION PROCESSING PROGRAM, AND TOMOGRAPHY APPARATUS PROVIDED THEREWITH

(71) Applicant: Shimadzu Corporation, Kyoto (JP)

(72) Inventor: Kenta Chinomi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 266 days.

(21) Appl. No.: 16/084,040

(22) PCT Filed: Mar. 11, 2016

(86) PCT No.: PCT/JP2016/057861
§ 371 (c)(1),
(2) Date: Sep. 11, 2018

(87) PCT Pub. No.: WO2017/154217
PCT Pub. Date: Sep. 14, 2017

(65) Prior Publication Data
US 2020/0311987 A1 Oct. 1, 2020

(51) Int. Cl.
*G06T 11/00* (2006.01)
*G01N 23/04* (2018.01)
*G01N 23/046* (2018.01)

(52) U.S. Cl.
CPC ............ *G06T 11/006* (2013.01); *G01N 23/04* (2013.01); *G01N 23/046* (2013.01);
(Continued)

(58) Field of Classification Search
CPC combination set(s) only.
See application file for complete search history.

(56) References Cited

U.S. PATENT DOCUMENTS 6,061,422 A * 5/2000 Miyazaki .............. G06T 11/006
378/15
8,958,660 B2 2/2015 Pal et al.
(Continued)

FOREIGN PATENT DOCUMENTS

| CN | 103619259 A | 3/2014 |
|---|---|---|
| JP | 2011-156302 A | 8/2011 |
| WO | 2015/0044237 A1 | 4/2015 |

OTHER PUBLICATIONS

Statistical image reconstruction for low-dose CT using nonlocal means-based regularization. Part II: An adaptive approach Hao Zhang, Comput Med Imaging Graph. Jul. 2015 ; 43: 26-35. doi:10.1016/j.compmedimag.2015.02.008. (Year: 2016).*

(Continued)

*Primary Examiner* — Iman K Kholdebarin
(74) *Attorney, Agent, or Firm* — Maier & Maier, PLLC

(57) ABSTRACT

A reconstruction processing method. The method includes an image updating step (Step S2) of updating a reconstruction image by an iterative approximation method, and a weighting coefficient map updating step (Step S4). In the weighting coefficient map updating step, a weighting coefficient map relative to prior knowledge is generated from the reconstruction image obtained by updating an image in the image updating step (Step S2), and a weighting coefficient of the prior knowledge relative to each pixel is controlled in accordance with the weighting coefficient map, whereby a weighting coefficient map is updated. As described above, the weighting coefficient map relative to the prior knowledge is generated from the reconstruction image (during estimation) obtained by updating the image, and the weighting coefficient of the prior knowledge relative to each pixel is controlled in accordance with the weighting coefficient map.

8 Claims, 8 Drawing Sheets

(52) U.S. Cl.
CPC ...... *G06T 11/008* (2013.01); *G01N 2223/401* (2013.01); *G06T 2211/424* (2013.01)

(56) References Cited

U.S. PATENT DOCUMENTS

| | | | | |
|---|---|---|---|---|
| 9,592,026 | B2* | 3/2017 | Ogura | A61B 6/0407 |
| 9,869,641 | B2* | 1/2018 | McCollough | G01N 22/00 |
| 10,360,697 | B2* | 7/2019 | Mailhe | G06T 11/006 |
| 2012/0128265 | A1* | 5/2012 | Silver | G06T 11/006 |
| | | | | 382/275 |
| 2014/0193055 | A1 | 7/2014 | Takahashi et al. | |
| 2014/0226887 | A1* | 8/2014 | Takahashi | G06T 5/002 |
| | | | | 382/131 |
| 2018/0082446 | A1* | 3/2018 | Chinomi | G06T 11/005 |
| 2019/0236763 | A1* | 8/2019 | Chan | A61B 6/5235 |
| 2020/0080965 | A1* | 3/2020 | Chinomi | C12Q 1/6806 |

OTHER PUBLICATIONS

Office Action dated May 8, 2020 in corresponding Chinese Application No. 201680083449.6; 12 pages including English-language translation.

European Search Report dated Sep. 12, 2019, in corresponding European application No. 16893543.5; 7 pages.

Hao Zhang et al.; "Statistical image reconstruction for low-dose CT using nonlocal means-based regularization. Part II: An adaptive approach"; Computerized Medical Imaging and Graphics; vol. 43; Mar. 6, 2015; pp. 26-35; Pergamon Press; New York, NY, US.

International Search Report with English translation and Written Opinion dated May 31, 2016 of corresponding International Application No. PCT/JP2016/057861; 8 pgs.

Catherine Lemmens et al., "Suppression of Metal Artifacts in CT Using a Reconstruction Procedure That Combines MAP and Projection Completion", IEEE Transactions on Medical Imaging, vol. 28 Issue:2 (2009).

\* cited by examiner

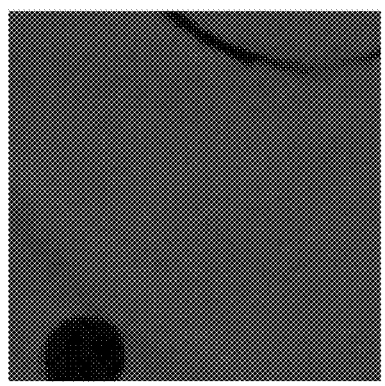 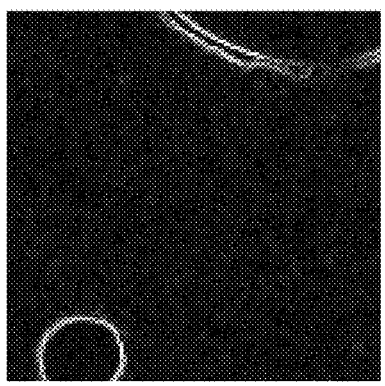 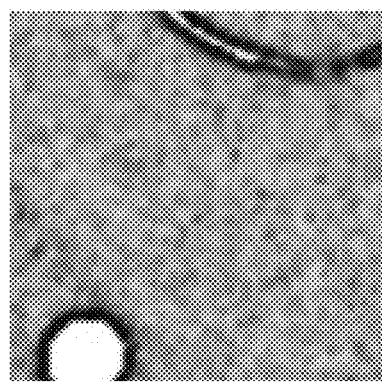
Fig.3(a)　　　　　　Fig.3(b)　　　　　　Fig.3(c)
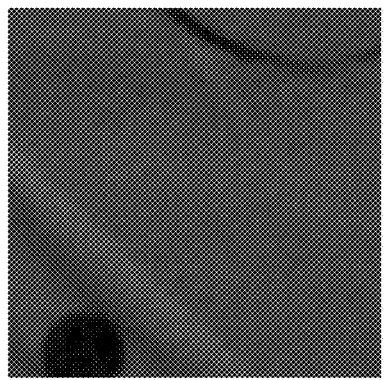 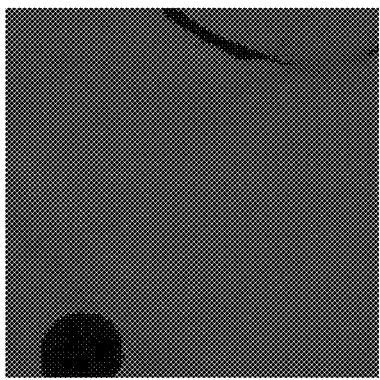 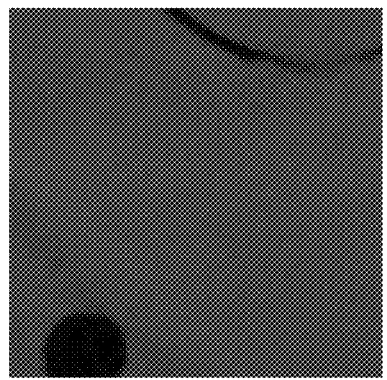
Fig.4(a)　　　　　　Fig.4(c)　　　　　　Fig.4(e)
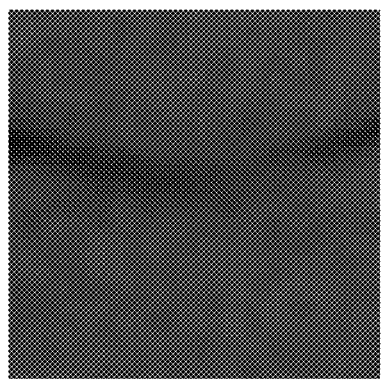 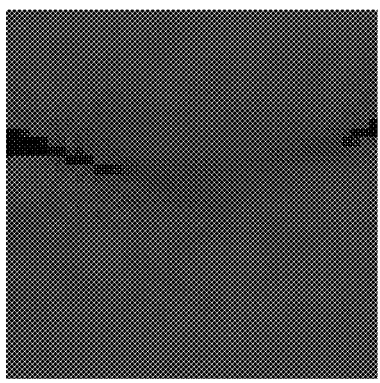 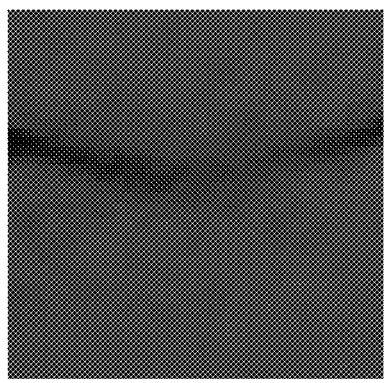
Fig.4(b)　　　　　　Fig.4(d)　　　　　　Fig.4(f)

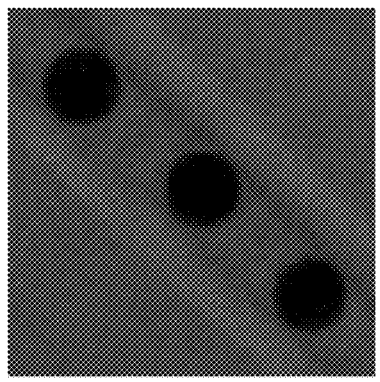
Fig.10(a)
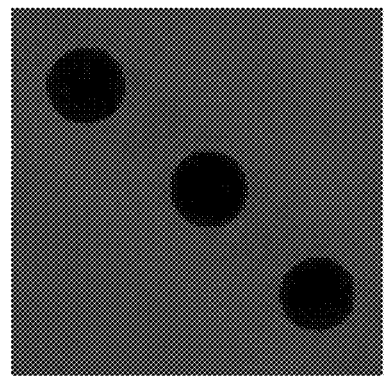
Fig.10(b)
Fig.11
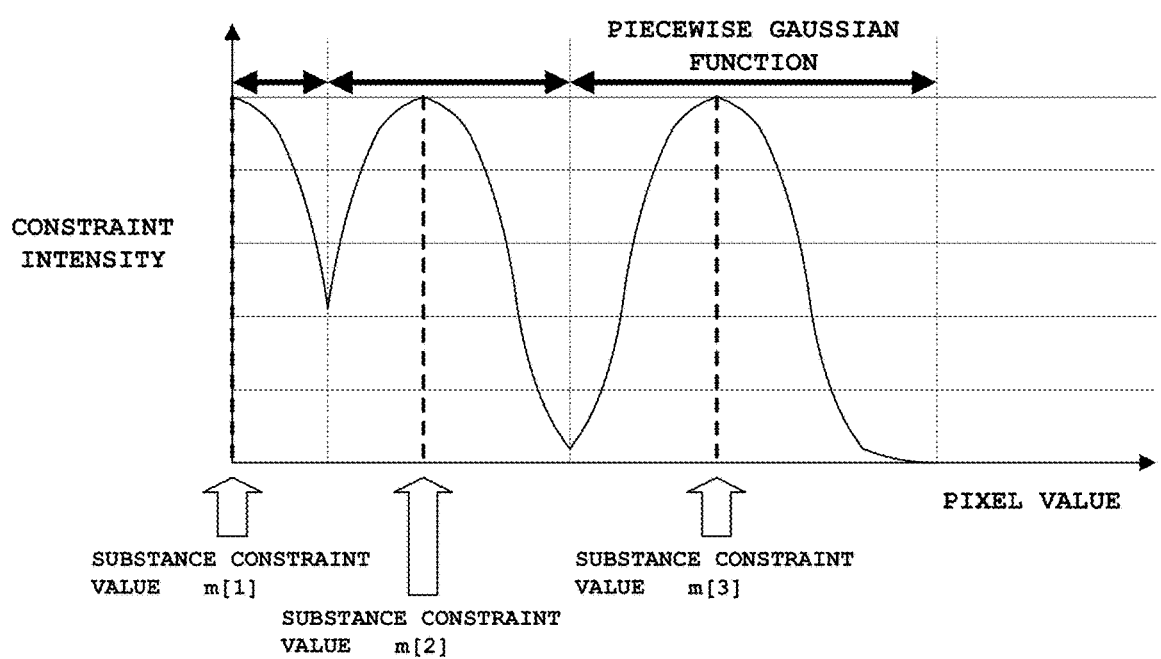

Fig.12
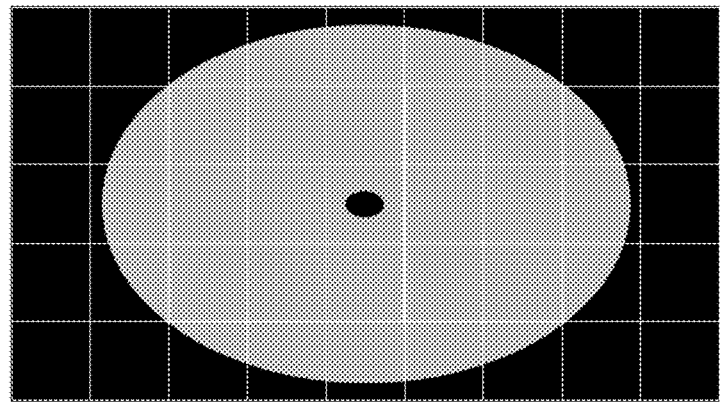
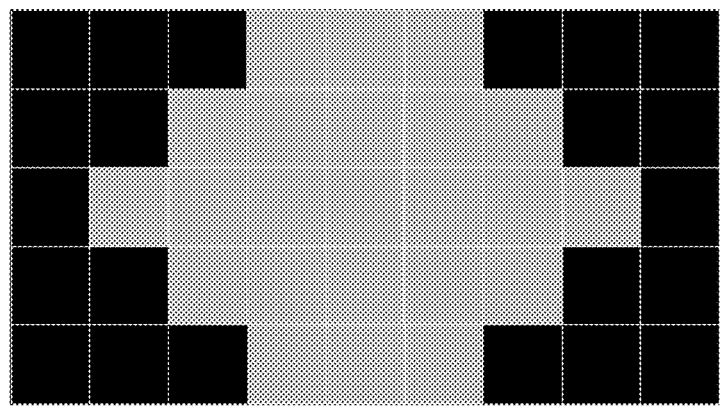
Fig.13(a)
Fig.13(b)

IMAGE RECONSTRUCTION PROCESSING METHOD, IMAGE RECONSTRUCTION PROCESSING PROGRAM, AND TOMOGRAPHY APPARATUS PROVIDED THEREWITH

FIELD

The present invention relates to an approach for reducing reconstructed artifacts in an image reconstruction processing method, an image reconstruction processing program, and a tomography apparatus provided therewith the program using an iterative approximation method.

BACKGROUND

An X-ray computed tomography (CT) apparatus is to be described as one example of a tomography apparatus. Filtered Back Projection (FBP) has been currently used as standard image reconstruction in the X-ray computed tomography. In recent years, study and commercialization for image reconstruction has been developed using an iterative approximation method along with enhanced performance of a calculating machine. The X-ray computed tomography possesses a long-standing drawback of artifacts resulting from various factors. In order to reduce the artifacts, the iterative approximation method has a feature to reflect a complex physical model or prior information (prior knowledge). Various approaches have been proposed. See, for example, Patent Literatures 1 and 2, and Non-Patent Literature 1.

Among these documents, Patent Literature 1 (Japanese Unexamined Patent Publication No. 2011-156302A) and Non-Patent Literature 1 each disclose an approach to employ estimation by posterior probability maximum (posterior a maximum (MAP) estimation) in accordance with Bayes' theorem. With the approach, information on constituent an imaging sample (substance information) is given as a prior probability, whereby a more precious solution is to be obtained. In other words, this an approach where an effect such that a reconstruction pixel has a pixel value of a substance specified beforehand (representing an X-ray attenuation coefficient) is applied to reduce artifacts.

The following describes an effect of the substance information in view of an image histogram. FIGS. 7 to 9 each illustrate a histogram used for the description. The histogram includes a vertical axis representing normalization with the maximum pixel value, and a horizontal axis where the pixel value increases to the right. For instance, one imaging sample is considered that is composed of four materials having different X-ray attenuation coefficients. Assuming that the materials are each a pure substance without any noise. Under such an ideal condition, four peaks are present in the reconstruction image histogram as in FIG. 7.

In actual, however, artifacts are generated from various factors. Consequently, the peaks in the histogram are distributed with widths as in FIG. 8. In contrast to this, the substance information is applied as a set of pixel values (four substance constraint values) that the reconstruction pixel may include, and the middle of the distribution of the pixel value corresponds to one of the substance constraint values. The substance information serves, whereby the pixel value around the distribution approaches toward the middle of the distribution as illustrated in FIG. 9. As a result, the distribution of the pixel value with some width gradually changes to a sharp peak, whereby an ideal image, i.e., an image with reduced artifacts is obtainable. FIG. 10 is an application example. It is revealed that FIG. 10(a) without any constraint of the substance information includes artifacts generated obliquely leftward, whereas FIG. 10(b) with some constraint of the substance information includes reduced artifacts.

The approach described above is considered as an iterative approximation method in accordance with objective function maximization. With the approach, a reconstruction image is obtainable through maximization of an objective function F represented by the following Expression (1).

$$F(\mu, y) = D(\mu, y) + \beta R(\mu), \quad (1)$$

where a reconstruction image vector is denoted as $\mu$ in the express (1), and projection data is denoted as y. Here, denoted "D" is referred to as a "data term" that represents adaptability to measured data, and is defined by likelihood such as measured projection (measured projection data obtained by an X-ray detector) and an estimation parameter (estimated image from the above Formula (1)). It should be noted that denoted $\mu$ and y are each a vector, and thus are actually boldfaced.

In addition, denoted R is typically referred to as a "penalty term", and reflects validity of the estimation parameter (estimation image). In the present specification, R is hereunder referred to as a "validity term" for convenience. The substance information mentioned above is reflected on the validity term, and employs a piecewise Gaussian function, for example, as in FIG. 11. Moreover, denoted $\beta$ is a coefficient for controlling an intensity of the validity term R, and is mostly determined empirically.

Moreover, actual calculation of the above Expression (1) is performed with use of an algorithm by a gradient method (also referred to as a "steepest-descent method") to retrieve the minimum value of a function, and optimization algorithm such as a Newton method from a gradient of a function (first-order differentiation) only. Moreover, in order to avoid a local solution, combined optimization such as a genetic algorithm and an annealing method may be incorporated. When a steepest-descent method is used as the optimization algorithm, an update expression for reconstruction image update by the objective function as above is expressed by the following Expression (2).

$$\mu^{n+1} = \mu^n + \alpha \times \nabla F(\mu, y) \quad (2)$$
$$= \mu^n + \alpha \times \nabla D(\mu, y) + \alpha \times \beta \times \nabla R(\mu),$$

where a gradient is denoted by $\nabla$ in the above Formula (2), and corresponds to partial differentiation about estimation parameter (reconstruction image).

The update expression in the j-th pixel is expressed by the following Mathematical Expression (3):

Mathematical Expression 1

$$\mu_j^{n+1} = \mu_j^n + \alpha \times \frac{\partial}{\partial \mu_j} D(\mu, y) + \alpha \times \beta \times \frac{\partial}{\partial \mu_j} R(\mu) \quad (3)$$

[Patent Literature 1] Japanese Unexamined Patent Publication No. 2011-156302A
[Patent Literature 2] U.S. Pat. No. 8,958,660
[Non-Patent Literature 1] C. Lemmens: Suppression of Metal Artifacts in CT Using a Reconstruction Procedure

SUMMARY

The above approach possesses such a drawback that a reconstruction image with high resolution is not obtainable as long as a discrete signal is processed. Specifically, some pixel where a plurality of mixed substances is present that is located on a boundary of an object as illustrated in FIG. 12, for example, as long as a discrete signal is processed (hereunder, the pixel is referred to as a "mixed pixel".) The mixed pixel has a pixel value (intermediate pixel value) that is obtained by adding pixel values of the substances at a certain ratio.

The substance information effectively acts on a non-mixed pixel where the artifact is generated. On the other hand, the substance information acts on the mixed pixel with such an intermediate pixel value as above so as to have a pixel value of a specific substance, leading to an inappropriate effect. Specifically, FIG. 13(a) illustrates the state with no substance information. FIG. 13(b) illustrates the state with the substance information. In this state, a fine structure disappears (see the center portion of the object in FIG. 13(b)), or the substance information that should be smooth originally includes unnaturally ragged portions (see a substance profile in FIG. 13(b).)

In the currently-used technique, constraint of the substance information is given to every pixel at certain intensity without distinction between the non-mixed pixel and the mixed pixel. Accordingly, the above phenomenon is hard to be avoided. Consideration of this case into the above Formula (1) reveals that no prior knowledge is reflected appropriately on the objective function in the sense that the presence of the mixed pixel is not assumed.

The present invention has been made regarding the state of the art noted above, and one object of the present invention is to provide an image reconstruction processing method, an image reconstruction processing program, and a tomography apparatus provided therewith that allow obtaining a reconstruction image with high resolution.

The present invention is constituted as stated below to achieve the above object. One aspect of the present invention provides an image reconstruction processing method for performing reconstruction processing. The image reconstruction processing method includes an image updating step of updating an image by a iterative approximation method; and a weighting coefficient map updating step of updating a weighting coefficient map by generating a weighting coefficient map relative to prior knowledge from a reconstruction image obtained from the image updated in the image updating step, and by controlling a weighting coefficient of the prior knowledge relative to each pixel in accordance with the weighting coefficient map. The reconstruction processing is performed with the iterative approximation method in the image updating step by updating the image by applying the weighting coefficient map updated in the weighting coefficient map updating step to the prior knowledge.

With the reconstruction processing method according to the aspect of the present invention, the weighting coefficient map relative to the prior knowledge is generated from the reconstruction image (during estimation) obtained by updating the image, and the weighting coefficient of the prior knowledge relative to each pixel is controlled in accordance with the weighting coefficient map. Consequently, overcoming of such a drawback is performable that the reconstruction image with high resolution is not obtainable. In other words, controlling the weighting coefficient of the prior knowledge relative to each pixel achieves avoidance of excess constraint to the pixel of the reconstruction image. Accordingly, the reconstruction image of high resolution is obtainable.

Patent Literature 2 (U.S. Pat. No. 8,958,660) suggests an approach to apply a coefficient map for calculating a voxel-dependent scaling factor to a gradient of an objective function (see, claims 1 and 4 of Patent Literature 2). That is, Patent Literature 2 differs from the present invention in generating a weighting coefficient map relative to an update quantity calculated over the objective function.

Moreover, Patent Literature 2 also discloses the feature that, if the weighting coefficient is controlled relative to the objective function entirely, the weighting coefficient is also applied to the data term. This causes a suppressed update quantity of the data term, leading to a lowered processing speed of the reconstruction in the iterative approximation method. As a result, a repeat count (a repetitive count) has to be increased in the iterative approximation method. In contrast to this, the weighting coefficient map is applied to only the prior knowledge in the present invention. This achieves the accelerated processing speed of the reconstruction in the iterative approximation method, thereby obtaining the reduced repeat count (the repetitive count).

In the image reconstruction processing according to the aspect of the present invention mentioned above, the following features (a) and (b) are adoptable: (a) the weighting coefficient map applied to a plurality of pieces of the prior knowledge that are different from each other individually is identical among the plurality of pieces of the prior knowledge; (b) the weighting coefficient map applied to a plurality of pieces of prior knowledge that are different from each other individually is different among the plurality of pieces of the prior knowledge. As noted above, the aspect of the present invention is applicable to a plurality of pieces of prior knowledge with the feature (a) or (b). Needless to say, the aspect of the present invention is applicable to one type of the prior knowledge.

Example of the weighting coefficient map include a map where information on a pixel with mixed substances is reflected. Using the map where the information is reflected with the information on the mixed pixel as the weighting coefficient map enables a lowered effect of the prior knowledge (substance information) relative to the mixed pixel. As a result, the reconstruction image with a retained fine structure (see FIG. 4) or a reconstruction image with a smooth boundary (see the profile of FIGS. 5 and 6) is obtainable while keeping the effect of reduced artifacts by the substance information.

Specifically, the weighting coefficient map is generated with edge information of the reconstruction image. For instance, the weighting coefficient map is set so as for a value thereof to be smaller as the edge intensity increases. Of course, unless otherwise, the reconstruction image is displayed (undergoes monitoring) to designate any position (pixel) of the displayed reconstruction image (considered as a boundary) by an operator (user), whereby the weighting coefficient map may be generated with the information inputted manually to the any position. Moreover, a smoothing filter and the like is applicable to the edge image edge image as the edge information for connecting fine edges.

Moreover, it is conceivable to perform smoothing to the reconstruction image itself after the reconstruction processing in order to smooth the boundary. In the iterative approximation method under constraint of the substance information with no weighting coefficient map, the reconstruction image is obtained while the fine structure is not retained. Accordingly, even if the smoothing is performed to the reconstruction image obtained while the fine structure is not retained, it is impossible to restore the fine structure.

In the image reconstruction processing method according to the aspect of the present invention, a timing of updating the weighting coefficient map corresponds to every image update, every given interval, every timing that satisfies a certain standard, or any timing.

Moreover, another aspect of the present invention provides an image reconstruction processing program characterized by causing a computer to execute the image reconstruction processing method of the above aspect of the present invention.

With the image reconstruction processing program according to the aspect of the present invention, the computer executes the image reconstruction processing method described above. This achieves avoidance of excess constraint to the pixel of the reconstruction image, thereby obtaining the reconstruction image of high resolution.

Moreover, another aspect of the present invention provides a tomography apparatus provided with the image reconstruction processing program of the present invention. The tomography apparatus is characterized by a calculating device for executing the image reconstruction processing program.

The tomography apparatus according to the aspect of the present invention includes the calculating device for executing the image reconstruction processing program. This achieves avoidance of excess constraint to the pixel of the reconstruction image, thereby obtaining the reconstruction image of high resolution.

With the reconstruction processing method according to the aspect of the present invention, the weighting coefficient map relative to the prior knowledge is generated from the reconstruction image obtained by updating the image, and the weighting coefficient of the prior knowledge relative to each pixel is controlled in accordance with the weighting coefficient map. Consequently, overcoming of such a drawback is performable that the reconstruction image with high resolution is not obtainable. In other words, controlling the weighting coefficient of the prior knowledge relative to each pixel achieves avoidance of excess constraint to the pixel of the reconstruction image. Accordingly, the reconstruction image of high resolution is obtainable.

Moreover, with the image reconstruction processing program according to the aspect of the present invention, the computer executes the image reconstruction processing method described above. This achieves avoidance of excess constraint to the pixel of the reconstruction image, thereby obtaining the reconstruction image of high resolution.

Furthermore, the tomography apparatus according to the aspect of the present invention includes the calculating device for executing the image reconstruction processing program. This achieves avoidance of excess constraint to the pixel of the reconstruction image, thereby obtaining the reconstruction image of high resolution.

BRIEF DESCRIPTION OF DRAWINGS

FIGS. 3(a)-3(c) illustrate generated data in each step, FIG. 3(a) is a reconstruction image μ obtained in Step S2, FIG. 3(b) is an edge image E obtained in Step S3, and FIG. 3(c) is a weighting coefficient map W obtained in Step S4.

FIGS. 4(a)-4(f) illustrate application results of the weighting coefficient map about retention of a fine structure, FIGS. 4(a) and (b) each a reconstruction image obtained with an iterative approximation method under no constraint of substance information, FIGS. 4(c) and (d) each a reconstruction image with an iterative approximation method under constraint of the substance information without any weighting coefficient map, and FIGS. 4(e) and (f) each a reconstruction image with an iterative approximation method under constraint of the substance information with a weighting coefficient map.

FIGS. 10(a) and 10(b) illustrate an application example in effect of the substance information, FIG. 10(a) a reconstruction image with the iterative approximation method under no constraint of the substance information, and FIG. 10(b) a reconstruction image with the iterative approximation method under constraint of the substance information.

FIG. 11 schematically illustrates a validity term of an objective function with use of a piecewise Gaussian function.

FIG. 12 schematically illustrates mixed pixels.

FIGS. 13(a) and 13(b) illustrate a secondary effect of the substance information applied to the mixed pixels, FIG. 13(a) schematically illustrating an effect without any substance information, and FIG. 13(b) schematically illustrating an effect with the substance information.

DETAILED DESCRIPTION

Figure 1:
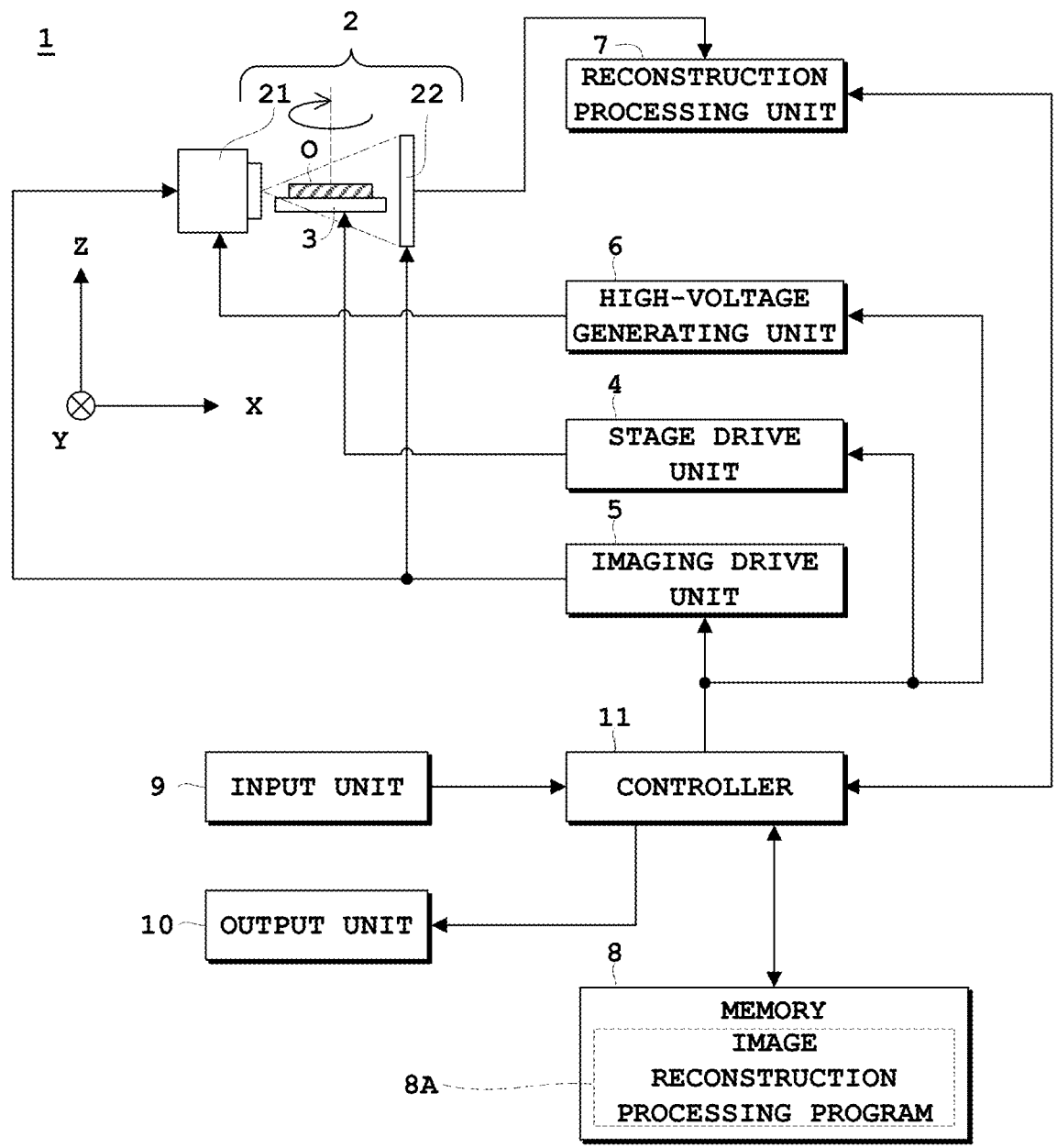
FIG. 1 is a schematic view and a block diagram of an X-ray computed tomography according to one embodiment.

The following describes one non-limiting embodiment of the present invention with reference to drawings. FIG. 1 is a schematic view and a block diagram of an X-ray computed tomography according to one embodiment. In this embodiment, an X-ray computed tomography apparatus is described as one example of the tomography apparatus.

As illustrated in FIG. 1, an X-ray computed tomography 1 of this embodiment includes an imaging unit 2 for imaging an object O, a stage 3 on which the object O is placed, a stage drive unit 4 for driving the stage 3, an imaging drive unit 5 for driving the imaging unit 2, a high-voltage generating unit 6 for generating high voltage used for applying tube current or tube voltage to an X-ray tube 21 of the imaging unit 2, and a reconstruction processing unit 7 for performing reconstruction processing to projection data obtained by an X-ray detector 22 of the imaging unit 2. The reconstruction processing unit 7 corresponds to the calculating device in the present invention.

The imaging unit 2 includes the X-ray tube 21 for emitting X-rays to the object O, and the X-ray detector 22 for detecting X-rays that are emitted from the X-ray tube 21 and pass through the object O. As is exemplified for an image intensifier (I.I) and a flat panel X-ray detector (FPD: Flat Panel Detector), the X-ray detector 22 is not particularly limited. In this embodiment, a flat panel X-ray detector (FPD) is described as one example of the X-ray detector 22.

The FPD is composed of a plurality of detecting elements that are arranged in row and column so as to correspond to pixels respectively. The detecting elements detect X-rays, and output data on the detected X-rays (charge signals) as X-ray detection signals. As described above, the X-ray tube 21 emits X-rays to the object O, and the X-ray detector 22 formed by the FPD detects the X-rays and outputs X-ray detection signals. Then, pixel values based on the X-ray detection signals are arranged so as to be correspondence with pixels (detecting elements), whereby projection data is obtained.

The stage drive unit 4 is composed of a motor and a driving shaft, not shown. The stage drive unit 4 causes the stage 3 to rotate around a Z-axis in horizontal plane in the drawing. Rotation of the stage 3 in horizontal plane also causes the object O to rotate around the Z-axis in horizontal plane, whereby a plurality of pieces of projection data is obtained.

The imaging drive unit 5 is composed of a motor and a driving shaft, not shown, in the same manner as the stage drive unit 4. The imaging drive unit 5 causes the X-ray detector 22 and the X-ray tube 21 to move individually to face each other for conducting X-ray computed tomography. Alternatively, the imaging drive unit 5 enables the X-ray tube 21 or the X-ray detector 22 to move horizontally (in an X-direction in the drawing) to change a scale for the X-ray computed tomography. Alternatively, the imaging drive unit 5 enables the X-ray tube 21 or the X-ray detector 22 to move obliquely relative to the X-axis to image the object obliquely.

The high-voltage generating unit 6 generates high voltage to apply tube current or tube voltage to the X-ray tube 21, whereby the X-ray tube 21 generates X-rays, and emits the X-rays to the object O. The reconstruction processing unit 7 executes an image reconstruction processing program 8A, mentioned later, thereby obtaining a reconstruction image for the object O. A concrete function of the reconstruction processing unit 7 is to be described later in detail.

The X-ray computed tomography apparatus 1 further includes a memory 8, an input unit 9, an output unit 10, and a controller 11.

A memory 8 writes and stores projection data obtained by the X-ray detector 22 or data such as the reconstruction image obtained by the reconstruction processing unit 7 via the controller 11. The memory 8 reads out the projection data or the reconstruction image as necessary to transmit and output it via a controller 11 to the output unit 10. The memory 8 is formed by a storage medium represented by a ROM (Read-only Memory), a RAM (Random-Access Memory), a hard disk, and the like.

Figure 2:
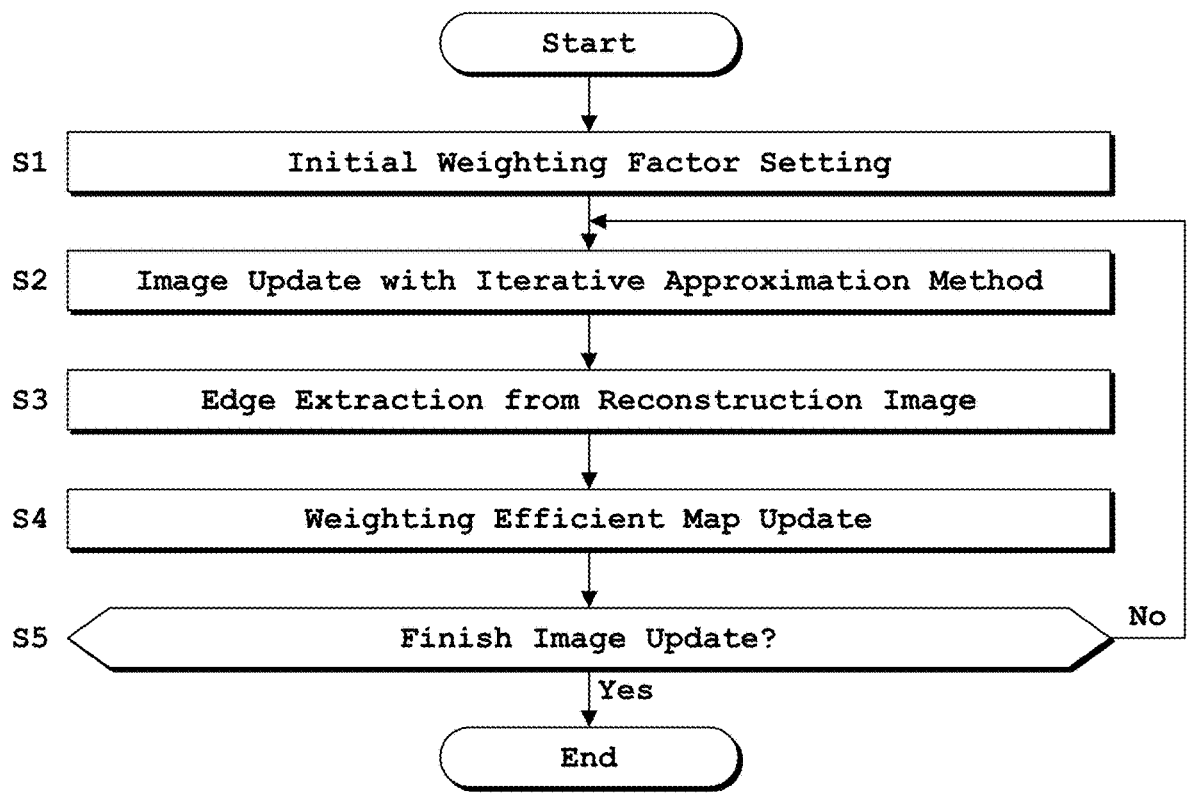
FIG. 2 is a flow chart of an image reconstruction processing according to the embodiment.

In this embodiment, the substance information given as the projection data or the constraint is read out from the memory 8, and is transmitted via the controller 11 into the reconstruction processing unit 7 where image reconstruction processing such as image update with the iterative approximation method or weighting coefficient map update of updating the weighting coefficient map relative to the prior knowledge is performed (see the flow chart in FIG. 2.) Moreover, the memory 8 stores an image reconstruction processing program 8A. The image reconstruction processing program 8A is read out from the memory 8 via the controller 11 to the reconstruction processing unit 7 where the image reconstruction processing program 8A is executed, whereby the image reconstruction processing indicated by the flow chart in FIG. 2 is performed. The image reconstruction processing program 8A corresponds to the image reconstruction processing program in the present invention.

An input unit 9 transmits the data or instructions inputted by the operator to the controller 11. The input unit 9 is composed of a keyboard, and pointing devices such as a mouse, a joystick, a trackball, and a touch panel.

An output unit 10 is formed by a display unit represented by a monitor, a printer, and the like. In this embodiment, the projection data or the reconstruction image is displayed on a monitor of the output unit 10.

The controller 11 controls en bloc each element that forms the X-ray computed tomography apparatus 1. The memory 8 writes and stores the projection data obtained by the X-ray detector 22 or the data such as the reconstruction image obtained by the reconstruction processing unit 7 via the controller 11, or transmits the projection data or the reconstruction image via the controller 11 to the output unit 10. When the output unit 10 is the display unit, the output units 10 performs output display. When the output unit 10 is a printer, the output unit 10 performs output printing.

In this embodiment, the reconstruction processing unit 7 and the controller 11 are each composed of a central processing unit (CPU) and the like. Alternatively, the reconstruction processing unit 7 may be composed of a GPU (Graphics Processing Unit) and the like.

Figure 5A:
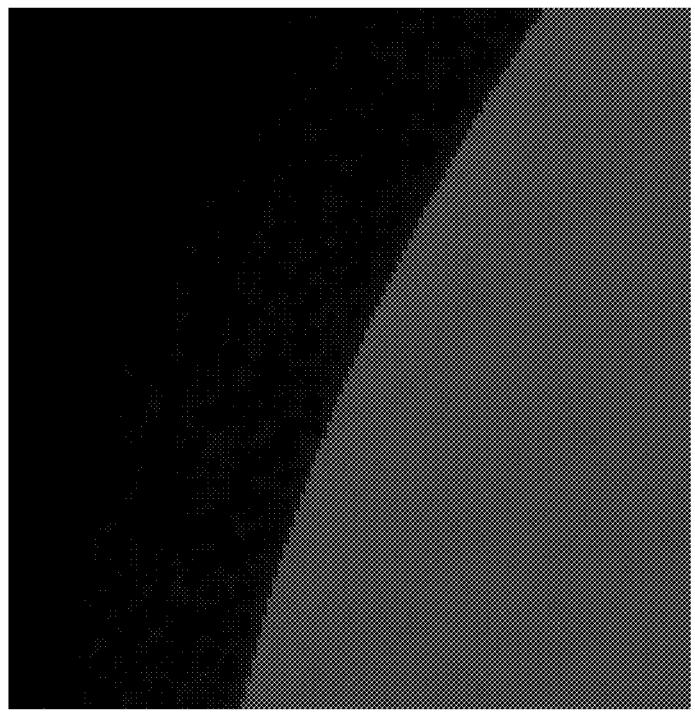
FIGS. 5(a) and 5(b) illustrate application result of the weighting coefficient map about reduction in ragged portion, FIG. 5(a) a reconstruction image without any weighting coefficient map, and FIG. 5(b) a reconstruction image with a weighting coefficient map.
Figure 5B:
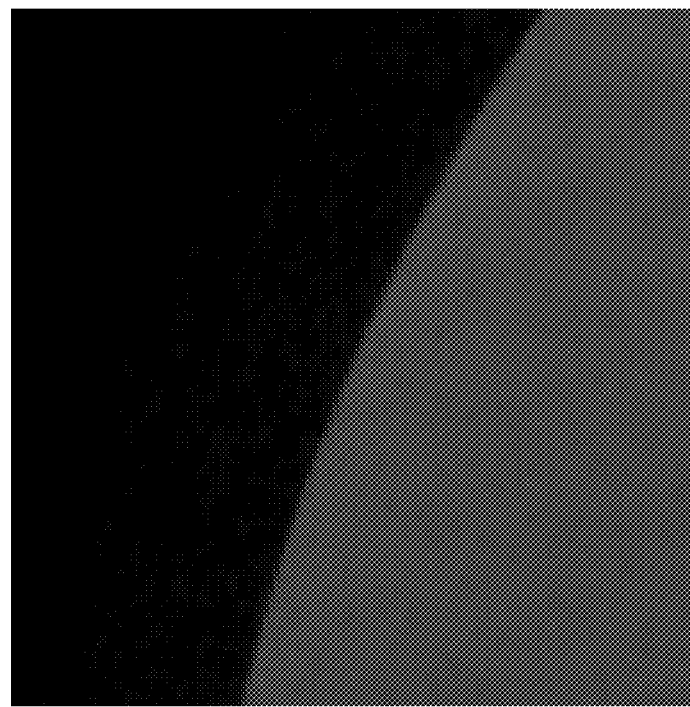
Figure 6:
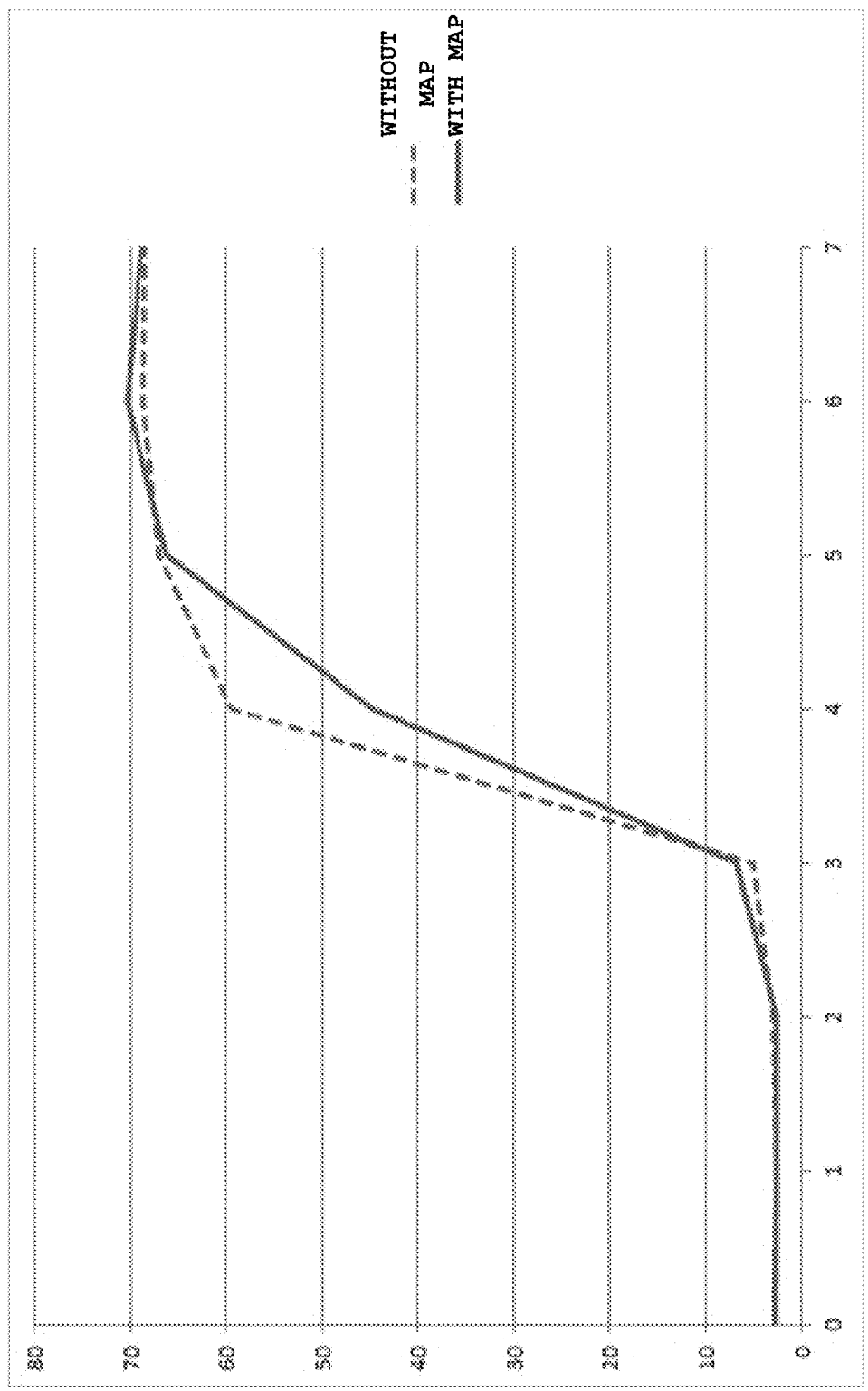
FIG. 6 illustrates a profile of a substance boundary.
Figure 7:
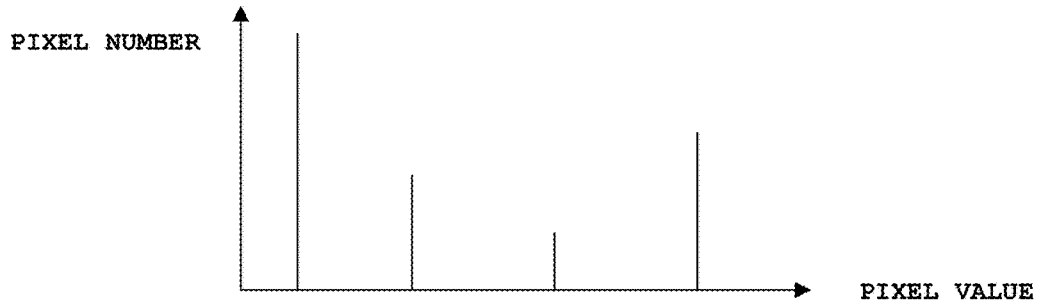
FIG. 7 schematically illustrates an ideal histogram.
Figure 8:
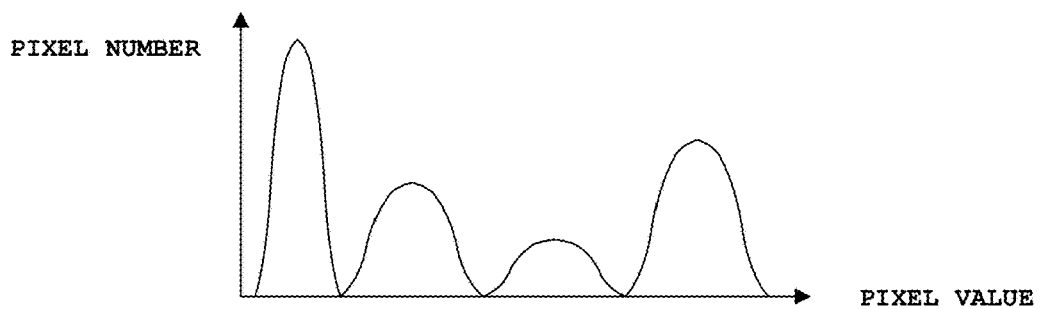
FIG. 8 schematically illustrates an actual histogram.
Figure 9:
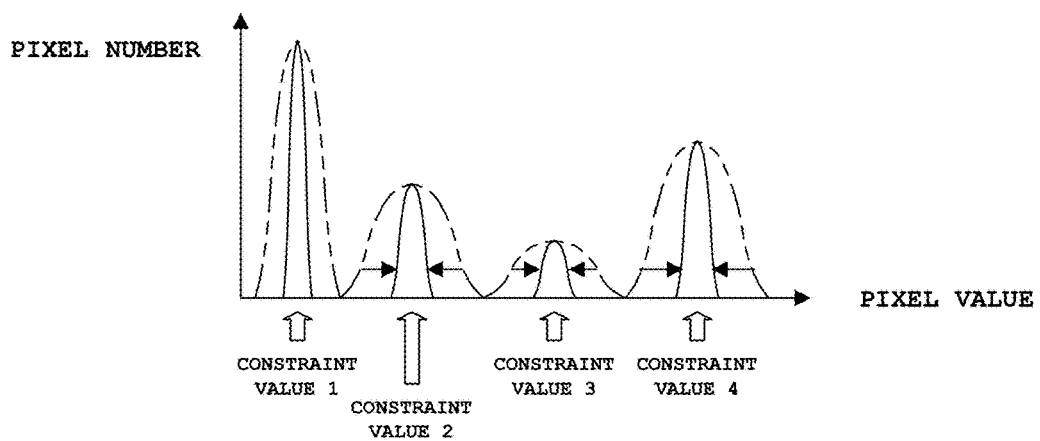
FIG. 9 schematically illustrates a histogram due to an effect of the substance information.

The following describes a concrete function of the reconstruction processing unit 7 (see FIG. 1) with reference to FIGS. 2 to 6. FIG. 2 is a flow chart of image reconstruction processing according to the embodiment. FIG. 3 illustrates generated data in each step, FIG. 3(a) is a reconstruction image µ obtained in Step S2, FIG. 3(b) is an edge image E obtained in Step S3, and FIG. 3(c) is a weighting coefficient map W obtained in Step S4. FIG. 4 illustrates application results of the weighting coefficient map about retention of a fine structure, FIGS. 4(a) and 4(b) are each a reconstruction image obtained with an iterative approximation method under no constraint of substance information, FIGS. 4(c) and 4(d) are each a reconstruction image with an iterative approximation method under constraint of the substance information without the weighting coefficient map, and FIGS. 4(e) and 4(f) are each a reconstruction image with an iterative approximation method under constraint of the substance information with the weighting coefficient map. FIG. 5 illustrates application results of the weighting coefficient map about reduction in ragged portion, FIG. 5(a) is a reconstruction image without the weighting coefficient map, and FIG. 5(b) is a reconstruction image with the weighting coefficient map. FIG. 6 illustrates a profile of a substance boundary.

(Step S1) Initial Weighting Factor Setting

A weighting coefficient map for prior knowledge is denoted as W. Each element of the weighting coefficient map W for prior knowledge is initialized by 1.0. A map coefficient corresponding to a j-th pixel is denoted as $W_j$. Alternatively, the weighting coefficient map W may be initialized with another initialization map. Examples of the prior knowledge include the substance information described above, and flatness information representing flatness over the pixel values.

(Step S2) Image Update by Iterative Approximation Method

The reconstruction image is denoted as µ. The reconstruction image µ is updated by various iterative approximation methods (see FIG. 3(a).) When the steepest-descent method described above is used as an optimization algorithm, an update expression of each pixel $\mu_j$ in the reconstruction image μ at n-th repetition is expressed by the following Mathematical Expression (4).

Mathematical Expression 2

$$\mu_j^{n+1} = \mu_j^n + \alpha \times \frac{\partial}{\partial \mu_j} D(\mu, y) + \alpha \times \beta \times W_j \times \frac{\partial}{\partial \mu_j} R(\mu) \quad (4)$$

The expression (4) is obtained by multiplying β in the expression (3) by $W_j$. This achieves the weight for prior knowledge having various values depending on the pixel position. In contrast to this, assuming that $W_j$ is 1, the expression (4) is equivalent to the expression (3). The expression (3) is an update expression for maximization (optimization) of the express (1), whereas the expression (4) is not directly derived from the express (1). Accordingly, to be exact, the expression (4) is not an update expression for maximization (optimization) of the express (1). In other words, replacement of the coefficient β indirectly corrects the prior knowledge of the objective function. The above description is made taking the steepest-descent method as one example. Alternatively, the Newton method described above is available for the optimization algorithm. Moreover, combined optimization such as the genetic algorithm and the annealing method is available.

Moreover, it is preferred that Step S2 includes processing of correcting physical properties (e.g., beam hardening and scattering) of the X-ray tube 21 (See FIG. 1) and the X-ray detector 22 (see FIG. 1.) This embodiment employs this process. However, this processing is omittable when these properties are negligible. In addition to this, appropriate change of presence and an order of correcting the physical properties is included in the present invention. The Step S2 corresponds to the image updating step in the present invention.

(Step S3) Edge Extraction from Reconstruction Image

The edge image is denoted as E. An edge is extraction from the reconstruction image μ obtained by the image update processing in Step S2, whereby an edge image E is generated (see FIG. 3(*b*).) An edge intensity at a j-th pixel is denoted as $E_j$. An edge extraction approach is performed with a Sobel filter or a Laplacian filter and the like. The processing with the filters enables calculation of the edge intensity $E_j$ (specifically, a first differential value, a second differential) depending on the pixel value of the reconstruction image μ. Moreover, a smoothing filter is applicable to the edge image E for connecting fine edges.

Moreover, as is already described in "Solution to Problem", it is conceivable to perform smoothing to the reconstruction image itself after the reconstruction processing for smoothing the boundary. In the iterative approximation method under constraint of the substance information with no weighting coefficient map, the reconstruction image is obtained while the fine structure is not retained. Accordingly, even if the smoothing is performed to the reconstruction image obtained while the fine structure is not retained, it is impossible to restore the fine structure.

(Step S4) Weighting Efficient Map Update

The weighting coefficient map W is updated using the edge image E extracted in the processing of Step S3 (see FIG. 3(*c*).) The following expression is adopted such that the value $W_j$ of the weighting coefficient map decreases as the edge intensity $E_j$ (j: pixel number) increases.

Example of Formula: $W_j = \exp(-\gamma \times E_j)$ (γ: a constant)

Such processing enables setting of an appropriate value to the map coefficient $W_j$ corresponding to the edge of the reconstruction image μ. As described above, Step S4 corresponds to the weighting coefficient map updating step in the present invention. Next, a counter variable n of a repeat count (a repetitive count) in the iterative approximation is incremented.

(Step S5) Finish Image Update?

The repetitive count for finishing the image update with the iterative approximation method is denoted as $N_{iter}$. It is determined whether or not the counter variable n reaches the repetitive count $N_{iter}$. The operator may set the repetitive count $N_{iter}$ in advance. If the counter variable is equal to or less than $N_{iter}$, the processing returns to Step S2 for continuously performing Steps S2 to S4. If the counter variable exceeds $N_{iter}$, a series of calculation is finished.

The estimation image obtained in such a manner as above is acquired as the reconstruction image. Alternatively, an estimation image obtained as under may be acquired as the reconstruction image. That is, the operator observes each estimation image obtained per update without setting any repetitive count $N_{iter}$, and then intermits a series of calculation in accordance with the observed results to obtain an estimation image. Alternatively, the determination of finishing the image update may be performed from whether some convergence evaluation value (e.g., an objective function value) is over or below the criteria value.

The processing of Steps S1 to S5 described above achieves a lowered effect of the prior knowledge (substance information) relative to the mixed pixels. As a result, the reconstruction image with a retained fine structure (see FIG. 4) or a reconstruction image with a smooth boundary (see the profile of FIGS. 5 and 6) is obtainable while keeping the effect of reduced artifacts by the substance information.

FIGS. 4(*a*), 4(*c*) and 4(*e*) are each a reconstruction image obtained from the same image with an iterative approximation method. FIGS. 4(*b*), 4(*d*) and 4(*f*) are each a reconstruction image obtained from the same image with an iterative approximation method. Under no constraint by the substance information, it is determined that FIG. 4(*a*) includes artifacts generated obliquely leftward. Under constraint by the substance information without any weighting coefficient map, it is determined that FIG. 4(*d*) includes the fine structure that is not retained. In contrast to this, under constraint the substance information with the weighting coefficient map as in this embodiment, it is determined that both FIGS. 4(*e*) and 4(*f*) are the reconstruction images with the retained fine structure while keeping an effect of reducing artifacts by the substance information. This achieves the reconstruction image without any removed fine structure.

FIGS. 5(*a*) and 5(*b*) are each a reconstruction image obtained from the same image with an iterative approximation method. Without any weighting coefficient map, ragged portions are generated at the boundary in FIG. 5(*a*), and a sharp step of a profile by dotted lines is confirmed in FIG. 6. In contrast to this, with the weighting coefficient map as in this embodiment, no ragged portion is generated at the boundary in FIG. 5(*b*), and a smooth step of a profile by solid lines is confirmed in FIG. 6. This enables the reconstruction image while the substance information, that should be smooth originally, is prevented from bringing into a ragged state unnaturally.

With the reconstruction processing method according to the aspect of this embodiment, the image (reconstruction image μ) is updated with the iterative approximation method in the image updating step (Step S2 in FIG. 2.) Then, the weighting coefficient map W relative to the prior knowledge is generated from the reconstruction image μ obtained by updating the image in the image updating step (Step S2), and the weighting coefficient $W_j$ of the prior knowledge relative to each pixel j is controlled in accordance with the weighting coefficient map W, whereby the weighting coefficient map W is updated in the weighting coefficient map updating step (Step S4 in FIG. 2.) As described above, the weighting coefficient map W relative to the prior knowledge is generated from the reconstruction image μ (during estimation) obtained by updating the image, and the weighting coefficient $W_j$ of the prior knowledge relative to each pixel j is controlled in accordance with the weighting coefficient map W. Consequently, overcoming of such a drawback is performable that the reconstruction image with high resolution is not obtainable. In other words, controlling the weighting coefficient $W_j$ of the prior knowledge relative to each pixel j achieves avoidance of excess constraint to the pixel of the reconstruction image μ. Accordingly, the reconstruction image μ of high resolution is obtainable.

Moreover, as already described in "Solution to Problem", Patent Literature 2 (U.S. Pat. No. 8,958,660) suggests an approach to apply a coefficient map for calculating a voxel-dependent scaling factor to a gradient of an objective function. That is, Patent Literature 2 differs from the embodiment of the present invention in generating a weighting coefficient map relative to an update quantity calculated over the objective function Moreover, Patent Literature 2 also discloses the feature that, if the weighting coefficient is controlled relative to the objective function entirely, the weighting coefficient is also applied to the data term. This causes a suppressed update quantity of the data term, leading to a lowered processing speed of the reconstruction in the iterative approximation method. As a result, a repeat count (a repetitive count) has to be increased in the iterative approximation method. In contrast to this, the weighting coefficient map is applied to only the prior knowledge (see validity term R in the above Expression (4)) in the embodiment of the present invention. This achieves an accelerated processing speed of the reconstruction in the iterative approximation method, thereby obtaining the reduced the repeat count (repetitive count) n.

In this embodiment, a map where the information on the mixed pixels with a plurality of substances mixed is reflected is used as the weighting coefficient map. Using the map where the information is reflected with the information on the mixed pixels as the weighting coefficient map enables a lowered effect of the prior knowledge (substance information) relative to the mixed pixels. As a result, the reconstruction image with a retained fine structure (see FIGS. 4(e) and 4(f)) or a reconstruction image with a smooth boundary (see the profile by solid lines in FIGS. 5(b) and 6) is obtainable while keeping the effect of reduced artifacts by the substance information.

Specifically, in this embodiment, the weighting coefficient map W is generated with edge information of the reconstruction image μ (see Step S4 in FIG. 2.) For instance, the weighting coefficient map is set so as to have a value $W_j$ smaller as the edge intensity $E_j$ (j: pixel number) increases like the following expression: $W_j=\exp(-\gamma \times E_j)$ Moreover, in this embodiment, a timing of updating the weighting coefficient map is performed every image update as illustrated in the flow chart of FIG. 2.

Moreover, with the image reconstruction processing program 8A (see FIG. 1) according to this embodiment, the computer (the CPU or the GPU that forms the reconstruction processing unit 7 illustrated in FIG. 1 in this embodiment) executes the image reconstruction processing method (see the flow chart in FIG. 2) in this embodiment. This achieves avoidance of excess constraint to the pixel of the reconstruction image μ, thereby obtaining the reconstruction image μ of high resolution.

Furthermore, the tomography apparatus (the X-ray computed tomography apparatus in this embodiment) according to this embodiment includes the calculating device (the CPU or the GPU that forms the reconstruction processing unit 7 illustrated in FIG. 1 in this embodiment) for executing the image reconstruction processing program 8A. This achieves avoidance of excess constraint to the pixel of the reconstruction image μ, thereby obtaining the reconstruction image μ of high resolution.

The present invention is not limited to the foregoing examples, but may be modified as follows.

(1) In the embodiment described above, the X-ray computed tomography apparatus is described as one example of the tomography apparatus. However, this is not particularly limitative as long as a tomography apparatus is used that performs reconstruction processing with an iterative approximation method. A magnetic resonance imaging (MRI) apparatus, an optical computed tomography apparatus, and a tomography apparatus with radiation other than X-rays (α-rays, β-rays, γ-rays and the like) are available.

(2) The embodiment described above is applied to the inspecting apparatus for technical use or industrial use as illustrated in FIG. 1. Alternatively, this embodiment is applicable to a medical device for a human body or small animals as a subject.

(3) As exemplified by X-rays of a single wavelength (monochromatic X-rays) or X-rays of multiple wavelengths (polychromatic X-rays), the types of X-rays applied is not particularly limited.

(4) The embodiment described above employs the imaging mode illustrated in FIG. 1. However, the imaging mode for tomography is not particularly limited as exemplified by tomosynthesis.

(5) In the embodiment described above, the expression (4) employs one type of prior knowledge (validity term R.) Alternatively, if a plurality of validity terms ($R_1$, $R_2$, ... ) is introduced, a weighting coefficient map W common to the validity terms may be generated or different weighting coefficient maps ($W_1$, $W_2$, ... ) corresponding to the validity terms respectively may be generated. That is, the following cases (a) and (b) are adoptable: (a) applying an identical weighting coefficient map relative to a plurality of pieces of prior knowledge (validity terms $R_1$, $R_2$, ... ) that are different from each other; (b) applying different weighting coefficient maps ($W_1$, $W_2$, ... ) to a plurality of pieces of prior knowledge (validity terms $R_1$, $R_2$, ... ) that are different from each other. For instance, an update expression of each pixel $\mu_j$ in the reconstruction image μ at n-th repetition is expressed by the following Mathematical Expression (5) when different weighting coefficient map $W_1$, $W_2$ are applied to two validity term $R_1$, $R_2$ respectively in the case (b). As already described for the expression (1), denoted $\beta_1$, $\beta_2$ are the coefficient for controlling an intensity of the validity term $R_1$, $R_2$, and is mostly determined empirically.

Mathematical Expression 3

$$\mu_j^{n+1} = \mu_j^n + \alpha \times \frac{\partial}{\partial \mu_j} D(\mu, y) + \alpha \times \beta_1 \times W_{1j} \times \frac{\partial}{\partial \mu_j} R_1(\mu) + \alpha \times \beta_2 \times W_{2j} \times \frac{\partial}{\partial \mu_j} R_2(\mu) \quad (5)$$

(6) In the embodiment described above, the weighting coefficient map is updated at the timing of every image update. Alternatively, the timing of updating the weighting coefficient map may be a timing of every given interval, a timing that satisfies a certain standard, or any timing.

(7) In the embodiment described above, the weighting coefficient map is generated automatically by generating the weighting coefficient map with edge information of the reconstruction image. However, the weighting coefficient map may be generated manually. For instance, the reconstruction image is displayed (undergoes monitoring) to designate any position (pixel) of the displayed reconstruction image (considered as a boundary) by an operator (user), whereby the weighting coefficient map may be generated with the information inputted manually to the any position.

(8) In the embodiment described above, the substance information is used as the prior knowledge. However, this is not limitative as long as the prior knowledge is used. For instance, flatness information representing flatness in the pixel values is applicable, or combination of the substance information and the flatness information is available.

As described above, the present invention is suitable for an inspecting device or a medical device for technical use or industrial use, such as X-ray computed tomography apparatus (e.g., tomosynthesis apparatus), an MRI apparatus, and an optical CT apparatus.

The invention claimed is:

1. An image reconstruction processing method for performing reconstruction processing, comprising:
    an image updating step of updating an image with an iterative approximation method; and
    an edge image extraction step of extracting an edge image from a reconstruction image obtained from the image updated in the image updating step,
    a weighting coefficient map updating step of updating a weighting coefficient map by generating a weighting coefficient map relative to prior knowledge from the edge image, and by controlling a weighting coefficient of the prior knowledge relative to each pixel in accordance with the weighting coefficient map,
    the reconstruction processing being performed with the iterative approximation method in the image updating step by updating the image by applying the weighting coefficient map updated in the weighting coefficient map updating step to the prior knowledge.

2. The image reconstruction processing method according to claim 1, wherein
    (a) the weighting coefficient map applied to a plurality of pieces of the prior knowledge that are different from each other individually is identical among the plurality of pieces of the prior knowledge.

3. The image reconstruction processing method according to claim 1, wherein
    (b) the weighting coefficient map applied to a plurality of pieces of the prior knowledge that are different from each other individually is different among the plurality of pieces of the prior knowledge.

4. The image reconstruction processing method according to claim 1, wherein
    the weighting coefficient map is a map where information on a pixels with mixed substances is reflected.

5. The image reconstruction processing method according to claim 4, wherein
    the weighting coefficient map is generated with edge information on the reconstruction image.

6. The image reconstruction processing method according to claim 1, wherein
    the weighting coefficient map is updated every image update, every given interval, every timing that satisfies certain standards, or every any timing.

7. An image reconstruction processing program, characterized by causing a computer to execute the image reconstruction processing method according to claim 1.

8. A tomography apparatus provided with the image reconstruction processing program according to claim 7, comprising:
    a calculating device that executes the image reconstruction processing program.

* * * * *